United States Patent
Bank et al.

(10) Patent No.: US 6,965,678 B2
(45) Date of Patent: Nov. 15, 2005

(54) ELECTRONIC ARTICLE COMPRISING LOUDSPEAKER AND TOUCH PAD

(75) Inventors: Graham Bank, Woodbridge (GB); Martin Colloms, London (GB); Neil Simon Owen, Huntingdon (GB); Neil Harris, Cambridge (GB); Martin Christopher Cassey, Cambridge (GB)

(73) Assignee: New Transducers Limited, Cambridgeshire (GB)

(*) Notice: Subject to any disclaimer, the term of this patent is extended or adjusted under 35 U.S.C. 154(b) by 215 days.

(21) Appl. No.: 10/199,510

(22) Filed: Jul. 22, 2002

(65) Prior Publication Data

US 2003/0059068 A1 Mar. 27, 2003

Related U.S. Application Data

(63) Continuation-in-part of application No. 09/768,002, filed on Jan. 24, 2001.
(60) Provisional application No. 60/350,033, filed on Jan. 23, 2002, provisional application No. 60/306,862, filed on Jul. 23, 2001, provisional application No. 60/218,062, filed on Jul. 13, 2000, provisional application No. 60/205,465, filed on May 19, 2000, and provisional application No. 60/178,315, filed on Jan. 27, 2000.

(30) Foreign Application Priority Data

Jul. 20, 2001 (GB) .............................. 0117658
Dec. 24, 2001 (GB) .............................. 0130764

(51) Int. Cl.$^7$ ............................................. H04R 25/00
(52) U.S. Cl. ...................... 381/152; 381/388; 381/190
(58) Field of Search ................................ 345/174, 175, 345/176, 178, 18.01, 18.02, 163, 172, 173, 177; 381/190, 191, 388, 87, 333, 152, 347, 348, 396, 431; 178/18.01, 18.02, 18.04; 181/157, 173, 150

(56) References Cited

U.S. PATENT DOCUMENTS

| 4,078,160 A | 3/1978 | Bost |
| 4,401,857 A | 8/1983 | Morikawa |
| 4,414,436 A | 11/1983 | Sashida et al. |

(Continued)

FOREIGN PATENT DOCUMENTS

| EP | 0 881 856 A1 | 12/1998 |
| GB | 2 166 022 A | 4/1986 |
| WO | WO 83/02364 A1 | 7/1983 |

(Continued)

OTHER PUBLICATIONS

Jonathan R. Bost et al., "A New Piezoelectric Driver Enhances Horn Performance," An Audio Engineering Society Preprint, Preprint No. 1374 (D–6), Presented at the 60$^{th}$ Convention, May 2–5, 1978, pp. 1–14.

*Primary Examiner*—Rexford Barnie
*Assistant Examiner*—Brian Ensey
(74) *Attorney, Agent, or Firm*—Foley & Lardner LLP

(57) ABSTRACT

A touch pad assembly for use in an electronic article. The assembly comprises a touch pad, a coupler for mechanically coupling the touch pad to casing of the electronic article and a transducer which is mounted by coupling means on the coupler or the touch pad to drive the casing as an acoustic radiator. An electronic article can incorporate the same. An electronic article comprises a body in or on which a bending wave loudspeaker is mounted. The loudspeaker comprises a bending wave acoustic radiator and an electromechanical force transducer mounted to the radiator to vibrate the radiator to produce an acoustic output. The transducer has an intended operative frequency range and comprises a resonant element having a frequency distribution of modes in the operative frequency range and coupling means for mounting the transducer to the radiator.

23 Claims, 13 Drawing Sheets

U.S. PATENT DOCUMENTS

| | | | |
|---|---|---|---|
| 4,481,663 A | 11/1984 | Spranger | |
| 4,593,160 A | 6/1986 | Nakamura | |
| 5,632,841 A | 5/1997 | Hellbaum et al. | |
| 6,262,717 B1 * | 7/2001 | Donohue et al. | 345/173 |
| 6,332,029 B1 | 12/2001 | Azima et al. | |
| 6,396,197 B1 * | 5/2002 | Szilagyi et al. | 310/330 |
| 6,554,098 B1 * | 4/2003 | Komura | 181/173 |
| 2001/0002865 A1 * | 6/2001 | Lipponen e tal. | 381/191 |

FOREIGN PATENT DOCUMENTS

| | | |
|---|---|---|
| WO | 0 711 096 A1 | 5/1996 |
| WO | WO 96/31333 A1 | 10/1996 |
| WO | WO 97/09842 A2 | 3/1997 |
| WO | WO 98/52383 A1 | 11/1998 |
| WO | WO 98/58416 A1 | 12/1998 |
| WO | WO 98/58521 A1 | 12/1998 |
| WO | WO 99/41939 A1 | 8/1999 |
| WO | WO 00/13464 A1 | 3/2000 |
| WO | WO 00/54548 A2 | 9/2000 |
| WO | WO 00/69212 A1 | 11/2000 |
| WO | WO 01/31971 A2 | 5/2001 |
| WO | WO 01/54450 A2 | 7/2001 |

* cited by examiner

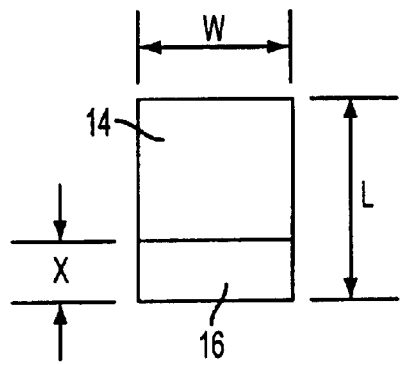
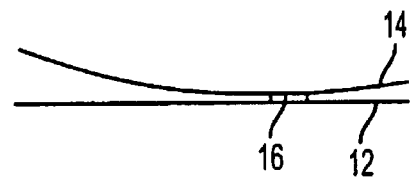
FIG. 24A  FIG. 24B
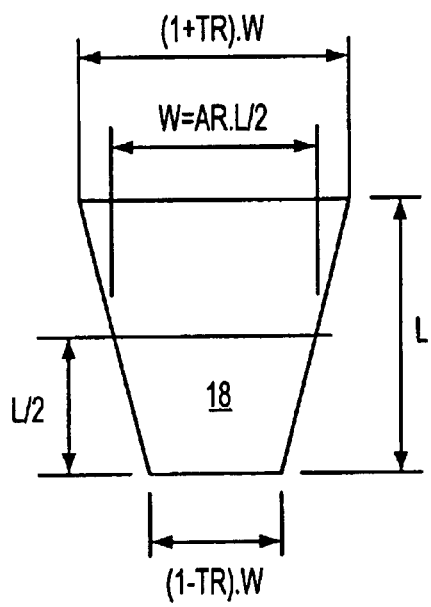
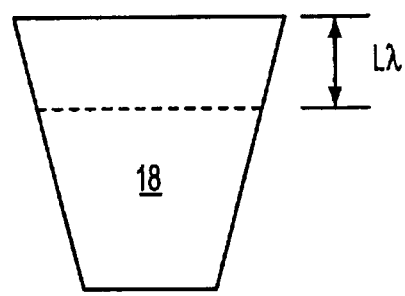
FIG. 25A  FIG. 25B

ELECTRONIC ARTICLE COMPRISING LOUDSPEAKER AND TOUCH PAD

This application claims the benefit of U.S. Provisional Application Ser. No. 60/306,862, filed Jul. 23, 2001, and U.S. Provisional Application Ser. No. 60/350,033, filed Jan. 23, 2002 (incorporated by reference in their entirety), and is a continuation-in-part application of U.S. patent application Ser. No. 09/768,002 filed Jan. 24, 2001, which claims the benefit of U.S. provisional application Ser. No. 60/178,315, filed Jan. 27, 2000; Ser. No. 60/205,465, filed May 19, 2000 and Ser. No. 60/218,062, filed Jul. 13, 2000.

TECHNICAL FIELD

The invention relates to electronic articles, in particular low power or self powered articles, for example electronic articles for personal use, such for example, as mobile telephones, personal organisers and pocket radios.

BACKGROUND ART

It is known from International patent application WO 00/69212 to provide a personal portable electronic article having a body or casing in or on which a bending wave loudspeaker is mounted. The bending wave loudspeaker comprises an acoustic radiator and a vibration exciter mounted on the radiator to vibrate the radiator to produce an acoustic output. The radiator is formed integrally with the body or casing as an injection moulding and defines a sub-area of the body or casing. By personal portable electronic article it is meant an article which is sufficiently small to be hand-held.

The radiator may be a distributed mode acoustic radiator speaker e.g. of the kind described in International application WO97/09842 and corresponding U.S. Pat. No. 6,332,029, the latter of which is herein incorporated by reference in its entirety.

In general, personal portable electronic articles are either low power or self-powered devices.

SUMMARY OF THE INVENTION

According to the invention, an electronic article comprises a body or casing in or on which a bending wave loudspeaker is mounted, the loudspeaker comprising a bending wave acoustic radiator and an electromechanical force transducer mounted to the radiator to vibrate the radiator to produce an acoustic output characterised in that the transducer has an intended operative frequency range and comprises a resonant element having a frequency distribution of modes in the operative frequency range and a coupler or coupling for mounting the transducer to the radiator. The coupling means may be mounted on the resonant element.

The electronic article may be a remote powered article, for example, with either a light or infrared power source. The electronic article may thus be selected from a wireless panel, personal PA, or solar panel. The electronic article may be a low power article, e.g. cordless devices such as portable radios, walkmans, personal data assistants (PDA), electronic toys, buzzers, polyphonic or monophonic sounders, chimes, electronic novelties, laptops, computer mouse, keyboards, display cases, personal computers, monitors or televisions. The electronic article may further be disposable, e.g. a disposable speaker or buzzer, low cost communication devices, credit cards, novelties, books, or cards.

The acoustic radiator may be moulded or co-moulded integrally with the body or casing. The radiator may be transparent and may, for example, define a display screen area.

The acoustic radiator may be a touch pad. The acoustic radiator may be whole or part of the casing which surrounds the touch pad. The coupling means may comprise the touch pad which is acoustically coupled to the casing, e.g. by a frame surrounding the periphery of the touch pad. A transducer may be mounted to the touch pad either directly on the touch pad or on the frame and the transducer drives the casing. The touch pad may be coupled to the casing by integral locking clips or separate locking components such as bolts, screws or bayonet fixings. Alternatively, the touch pad may be a friction fit on the casing.

In this way, an integrated assembly comprising the touch pad and transducer may be used to drive the acoustic radiator. The touch pad and the casing surrounding the touch pad may both act as acoustic radiators with the casing acting as the primary acoustic radiator. If desired, at least one additional transducer may be mounted on the primary acoustic radiator. The touch pad assembly may replace a standard touch pad in any electronic equipment, e.g. a laptop or a personal data assistant.

The resonant element may be active (e.g., a piezoelectric transducer) and may be in the form of a strip of piezoelectric material. Alternatively, the resonant element may be passive and the transducer may further comprise an active transducer e.g. an inertial or grounded vibration transducer, actuator or exciter e.g. moving coil transducer. The active transducer may be a bender or torsional transducer (e.g. of the type taught in WO 00/13464 and corresponding U.S. patent application Ser. No. 09/384,419). Furthermore, the transducer may comprise a combination of passive and active elements to form a hybrid transducer.

A number of transducer, exciter, or actuator mechanisms have been developed to apply a force to a structure, e.g. an acoustic radiator of a loudspeaker. There are various types of these transducer mechanisms, for example moving coil, moving magnet, piezoelectric, or magnetostrictive types. Typically, electrodynamic speakers using coil and magnet type transducers lose 99% of their input energy to heat whereas a piezoelectric transducer may lose as little as 1%. Thus, piezoelectric transducers are popular because of their high efficiency.

There are several problems with piezoelectric transducers, for example, they are inherently very stiff, for example comparable to brass foil, and are thus difficult to match to an acoustic radiator, especially to the air. Raising the stiffness of the transducer moves the fundamental resonant mode to a higher frequency. Thus, such piezoelectric transducers may be considered to have two operating ranges. The first operating range is below the fundamental resonance of the transducer. This is the "stiffness controlled" range where velocity rises with frequency and the output response usually needs equalisation. This leads to a loss in available efficiency. The second range is the resonance range beyond the stiffness range, which is generally avoided because the resonances are rather fierce.

Moreover, the general teaching is to suppress resonances in a transducer, and thus piezoelectric transducers are generally used only used in the frequency range below or at the fundamental resonance of the transducers. Where piezoelectric transducers are used above the fundamental resonance frequency it is necessary to apply damping to suppress resonance peaks.

The problems associated with piezoelectric transducers similarly apply to transducers comprising other "smart" materials, i.e. magnetostrictive, electrostrictive, and electret type materials. Various piezoelectric transducers are also known, for example as described in EP 0993 231A of Shinsei Corporation, EP 0881 856A of Shinsei Corporation, U.S. Pat. No. 4,593,160 of Murata Manufacturing Co. Limited, U.S. Pat. No. 4,401,857 of Sanyo Electric Co. Limited, U.S. Pat. No. 4,481,663 of Altec Corporation and UK patent application GB2,166,022A of Sawafuji. However, it is an object of the invention to employ an improved transducer.

The transducer used in the present invention may be considered to be an intendedly modal transducer. The coupling means may be attached to the resonant element at a position which is beneficial for coupling modal activity of the resonant element to the interface. Parameters, (e.g. aspect ratio, bending stiffness, thickness and geometry) of the resonant element may be selected to enhance the distribution of modes in the resonant element in the operative frequency range. The bending stiffness and thickness of the resonant element may be selected to be isotropic or anisotropic. The variation of bending stiffness and/or thickness may be selected to enhance the distribution of modes in the resonant element. Analysis, e.g. computer simulation using FEA or modelling, may be used to select the parameters.

The distribution may be enhanced by ensuring a first mode of the active element is near to the lowest operating frequency of interest. The distribution may also be enhanced by ensuring a satisfactory, e.g. high, density of modes in the operative frequency range. The density of modes is preferably sufficient for the active element to provide an effective mean average force which is substantially constant with frequency. Good energy transfer may provide beneficial smoothing of modal resonances. Alternatively, or additionally, the distribution of modes may be enhanced by distributing the resonant bending wave modes substantially evenly in frequency, i.e. to smooth peaks in the frequency response caused by "bunching" or clustering of the modes. Such a transducer may thus be known as a distributed mode transducer or DMT.

Such an intendedly modal or distributed mode transducer is described in International patent application WO 01/54450 and corresponding U.S. patent application Ser. No. 09/768,002, filed Jan. 24, 2001 (the latter of which is herein incorporated by reference).

The transducer may comprise a plurality of resonant elements each having a distribution of modes, the modes of the resonant elements being arranged to interleave in the operative frequency range and thus enhance the distribution of modes in the transducer as a whole device. The resonant elements may have different fundamental frequencies and thus, the parameters (e.g. loading, geometry or bending stiffness) of the resonant elements may be different.

The resonant elements may be coupled together by a connector or connecting means in any convenient way, e.g. on generally stiff stubs, between the elements. The resonant elements are preferably coupled at coupling points which enhance the modality of the transducer and/or enhance the coupling at the site to which the force is to be applied. Parameters of the connecting means may be selected to enhance the modal distribution in the resonant element. The resonant elements may be arranged in a stack. The coupling points may be axially aligned.

The resonant element may be plate-like or may be curved out of planar. A plate-like resonant element may be formed with slots or discontinuities to form a multi-resonant system. The resonant element may be beam-shaped, trapezoidal, hyperelliptical, or may be generally disc shaped. Alternatively, the resonant element may be rectangular and may be curved out of the plane of the rectangle about an axis along the short axis of symmetry.

The resonant element may be modal along two substantially normal axes, each axis having an associated fundamental frequency. The ratio of the two fundamental frequencies may be adjusted for best modal distribution, e.g. about 9:7 (~1.286:1).

As examples, the arrangement of such modal transducer may be any of: a flat piezoelectric disc; a combination of at least two or preferably at least three flat piezoelectric discs; two coincident piezoelectric beams; a combination of multiple coincident piezoelectric beams; a curved piezoelectric plate; a combination of multiple curved piezoelectric plates or two coincident curved piezoelectric beams.

The interleaving of the distribution of the modes in each resonant element may be enhanced by optimising the frequency ratio of the resonant elements, namely the ratio of the frequencies of each fundamental resonance of each resonant element. Thus, the parameter of each resonant element relative to one another may be altered to enhance the overall modal distribution of the transducer.

When using two active resonant elements in the form of beams, the two beams may have a frequency ratio (i.e. ratio of fundamental frequency) of about 1.27:1. For a transducer comprising three beams, the frequency ratio may be about 1.315:1.147:1. For a transducer comprising two discs, the frequency ratio may be about 1.1+/−0.02 to 1 to optimise high order modal density or may be about 3.2 to 1 to optimise low order modal density. For a transducer comprising three discs, the frequency ratio may be about 3.03:1.63:1 or may be about 8.19:3.20:1.

The parameters of the coupling means may be selected to enhance the distribution of modes in the resonant element in the operative frequency range. The coupling means may be vestigial, e.g. a controlled layer of adhesive.

The coupling means may be positioned asymmetrically with respect to the panel so that the transducer is coupled asymmetrically. The asymmetry may be achieved in several ways, for example by adjusting the position or orientation of the transducer with respect to axes of symmetry in the panel or the transducer.

The coupling means may form a line of attachment. Alternatively, the coupling means may form a point or small local area of attachment where the area of attachment is small in relation to the size of the resonant element. The coupling means may be in the form of a stub and have a small diameter, e.g. about 3 to 4 mm. The coupling means may be low mass.

The coupling means may comprise more than one coupling point and may comprise a combination of points and/or lines of attachment. For example, two points or small local areas of attachment may be used, one positioned near centre and one positioned at the edge of the active element. This may be useful for plate-like transducers which are generally stiff and have high natural resonance frequencies.

Alternatively, only a single coupling point may be provided. This may provide the benefit, in the case of a multi-resonant element array, that the output of all the resonant elements is summed through the single coupling means so that it is not necessary for the output to be summed by the load. The coupling means may be chosen to be located at an anti-node on the resonant element and may be chosen to deliver a constant average force with frequency. The coupling means may be positioned away from the centre of the resonant element.

The position and/or the orientation of the line of attachment may be chosen to optimise the modal density of the resonant element. The line of attachment is preferably not coincident with a line of symmetry of the resonant element. For example, for a rectangular resonant element, the line of attachment may be offset from the short axis of symmetry (or centre line) of the resonant element. The line of attachment may have an orientation which is not parallel to a symmetry axis of the panel.

The shape of the resonant element may be selected to provide an off-centre line of attachment which is generally at the centre of mass of the resonant element. One advantage of this embodiment is that the transducer is attached at its centre of mass and thus there is no inertial imbalance. This may be achieved by an asymmetric shaped resonant element which may be in the shape of a trapezium or trapezoid.

For a transducer comprising a beam-like or generally rectangular resonant element, the line of attachment may extend across the width of the resonant element. The area of the resonant element may be small relative to that of the acoustic radiator.

The acoustic radiator may be in the form of a panel. The panel may be flat and may be lightweight. The material of the acoustic radiator may be anisotropic or isotropic.

The acoustic radiator may have a distribution of resonant bending wave modes as taught in WO 97/09842 and corresponding U.S. Pat. No. 6,332,029 and the properties of the acoustic radiator may be chosen to distribute the resonant bending wave modes substantially evenly in frequency, i.e. to smooth peaks in the frequency response caused by "bunching" or clustering of the modes.

In particular, the properties of the acoustic radiator may be chosen to distribute the lower frequency resonant bending wave modes substantially evenly in frequency. The lower frequency resonant bending wave modes are preferably the ten to twenty lowest frequency resonant bending wave modes of the acoustic radiator.

The transducer location may be chosen to couple substantially evenly to the resonant bending wave modes in the acoustic radiator, in particular to lower frequency resonant bending wave modes. In other words, the transducer may be mounted at a location where the number of vibrationally active resonance anti-nodes in the acoustic radiator is relatively high and conversely the number of resonance nodes is relatively low. Any such location may be used, but the most convenient locations are the near-central locations between about 38% to 62% along each of the length and width axes of the acoustic radiator, but off-centre. Specific or preferential locations are at about $3/7$, $4/9$ or $5/13$ of the distance along the axes; a different ratio for the length axis and the width axis is preferred. Preferred is about $4/9$ length and about $3/7$ width of an isotropic panel having an aspect ratio of about 1:1.13 or about 1:1.41.

The operative frequency range may be over a relatively broad frequency range and may be in the audio range and/or ultrasonic range. There may also be applications for sonar and sound ranging and imaging where a wider bandwidth and/or higher possible power will be useful by virtue of distributed mode transducer operation. Thus, operation over a range greater than the range defined by a single dominant, natural resonance of the transducer may be achieved.

The lowest frequency in the operative frequency range is preferably above a predetermined lower limit which is about the fundamental resonance of the transducer.

For example, for a beam-like active resonant element, the force may be taken from the centre of the beam, and may be matched to the mode shape in the acoustic radiator to which it is attached. In this way, the action and reaction may co-operate to give a constant output with frequency. By connecting the resonant element to the acoustic radiator at an anti-node of the resonant element, the first resonance of the resonant element may appear to be a low impedance. In this way, the acoustic radiator should not amplify the resonance of the resonant element.

According to a second aspect of the invention, there is provided a touch pad assembly for use in an electronic article, e.g. laptop or PDA, the assembly comprising a touch pad, coupling means for mechanically coupling the touch pad to casing of the electronic article and a transducer which is mounted on the coupling means or the touch pad to drive the casing as an acoustic radiator.

The coupling means may be in the form of a frame surrounding the periphery of the touch pad. A transducer may be mounted on the touch pad or on the frame. The touch pad may be coupled to the casing by integral locking clips or separate locking components such as bolts, screws or bayonet fixings. Alternatively, the touch pad may be a friction fit on the casing.

BRIEF DESCRIPTION OF DRAWINGS

Examples that embody the best mode for carrying out the invention are described in detail below and are diagrammatically illustrated in the accompanying drawings in which:

FIG. 24a is a schematic plan view of a parameterised model of a transducer which may be used in the present invention;

FIG. 24b is a section perpendicular to the line of attachment of the transducer of FIG. 24a;

FIG. 25a is a schematic plan view of a parameterised model of a transducer which may be used in the present invention; and FIG. 25b is a schematic plan view of the transducer of FIG. 25a.

DETAILED DESCRIPTION

Figure 1A:
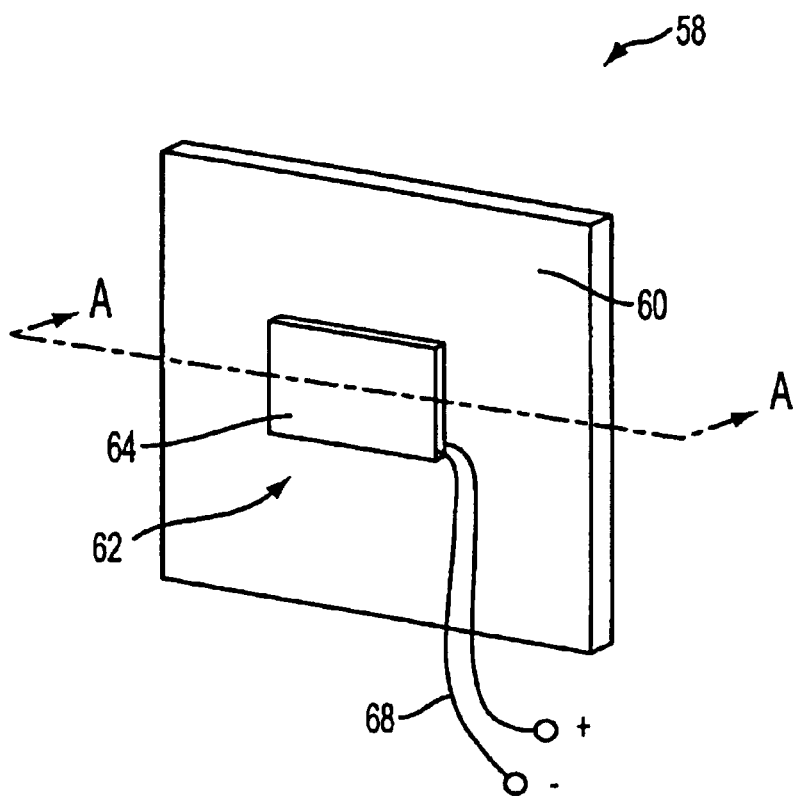
FIG. 1A shows a front perspective view of a disposable loudspeaker embodying the present invention.
Figure 1B:
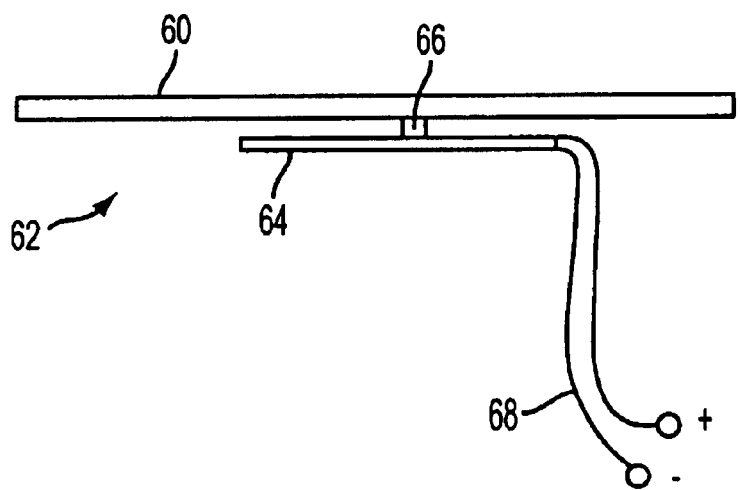
FIG. 1B shows and a cross-sectional view along line AA of FIG. 1A.

FIGS. 1A and 1B show a disposable loudspeaker, for example, a polyphonic sounder, disposable buzzer, credit card or other novelty loudspeaker. The loudspeaker comprises a panel (60) which is capable of supporting bending wave vibration, preferably resonant bending wave vibration and a transducer (62) mounted to the panel (60) by a connecting stub (66) to excite bending wave vibration to produce an acoustic output. The transducer (62) is an intendedly modal transducer or distributed mode transducer as hereinbefore described and as described in WO 01/54450 and corresponding U.S. patent application Ser. No. 09/768, 002. The transducer (62) comprises a piezoelectric plate element (64). Two flexible wires in the form of connecting leads (68) provide electrical input to the plate element (64).

Figure 2A:
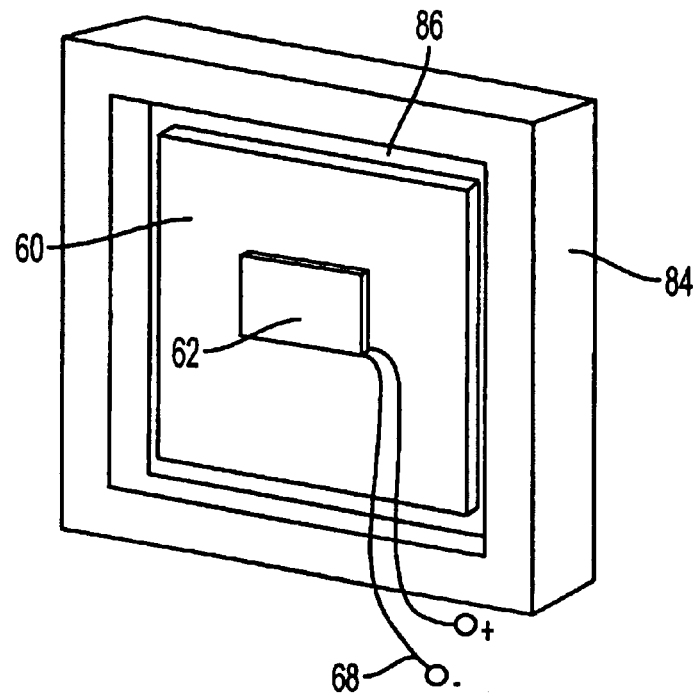
FIGS. 2A and 2B show front perspective and side views of a loudspeaker component embodying the present invention.
Figure 2B:
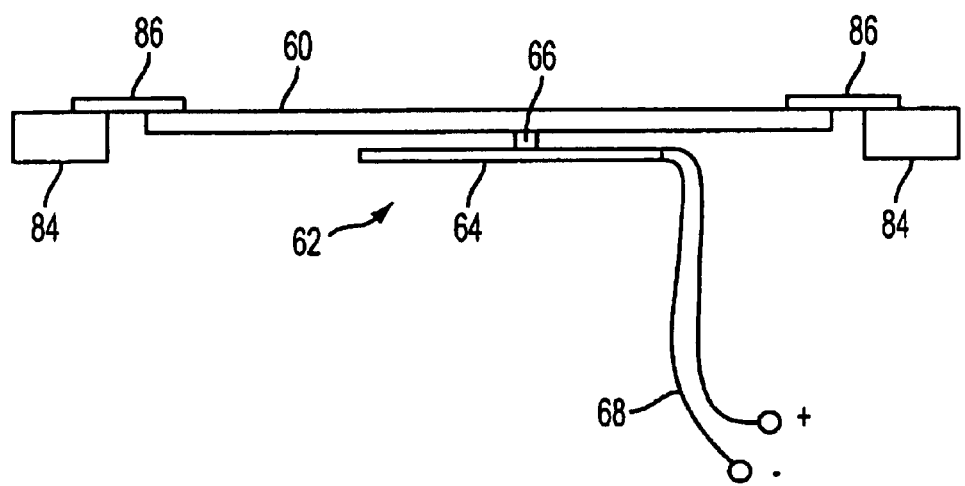

FIGS. 2A and 2B show a loudspeaker (58) similar to that of FIGS. 1A and 1B and thus elements in common have the same reference number. The loudspeaker (58) is mounted by way of a flexible surround (86) onto a support frame (84) which extends around the loudspeaker periphery. The support frame (84) allows the loudspeaker to be easily mounted onto a surface or additional support.

Figure 3:
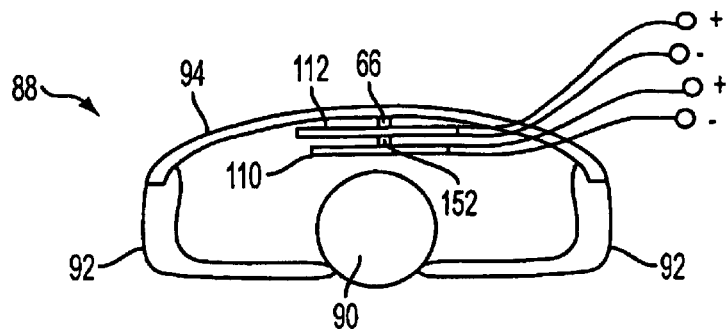
FIG. 3 shows a cross-section of a mouse or pointing device for a personal computer embodying the present invention.

FIG. 3 shows a cross section of a mouse (88) which is used as a pointing device in a computer system (not shown). The mouse (88) comprises the standard components such as ball (90), lower case (92) and cover (94). The cover (94) is designed to be capable of supporting bending wave vibration, preferably resonant bending wave vibration. An intendedly modal transducer (108) is mounted to the cover (94) by a connecting stub (66) to excite bending wave vibration to produce an acoustic output.

The transducer (108) comprises upper and lower bimorph beams (112) and (110), the upper beam (112) being connected to the cover (94) by the stub (66) which extends across the width of the beams. The stub may be about 1–2 mm wide and high and may be made from hard plastics and/or metal with suitable insulating layers to prevent electrical short circuits.

The upper beam (112) is longer than the lower beam (110) and the beams are connected by a centrally mounted stub (152). Each beam consists of three layers, namely two outer layers of piezoelectric ceramic material, e.g. PZT 5H, sandwiching a central brass vane. The outer layers may be attached to the brass vane by adhesive layers which are typically about 10–15 microns in thickness.

Figure 4:
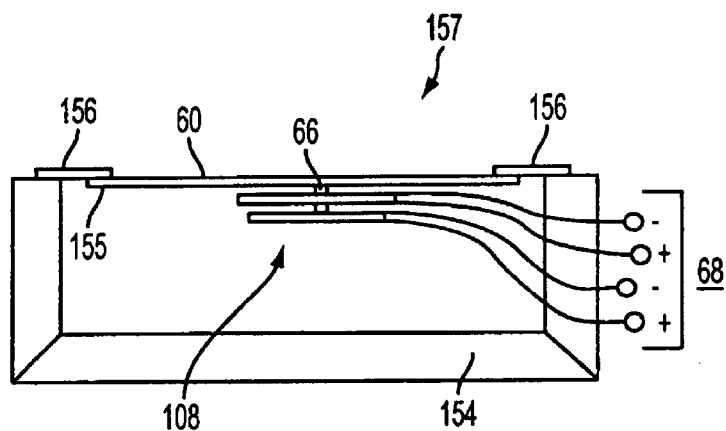
FIG. 4 shows a cross-section of a loudspeaker embodying the present invention mounted in an enclosure.

FIG. 4 shows a panel (60) which is capable of supporting bending wave vibration, preferably resonant bending wave vibration. The panel (60) is mounted in a closed box (154), by way of a flexible suspension (156) which extends around the periphery of the panel (60). An intendedly modal transducer (108), similar to that used in FIG. 3, is mounted to the panel (60) by a connecting stub (66) to excite bending wave vibration to produce an acoustic output.

The closed box (154) essentially prevents sound radiated from the rear (155) of the panel (60) from interfering with sound radiated from the front (157) of the panel. The box (154) thus acts as a baffle to prevent acoustical cancellation. The box (154) may be filled with a suitable absorber.

Figure 5:
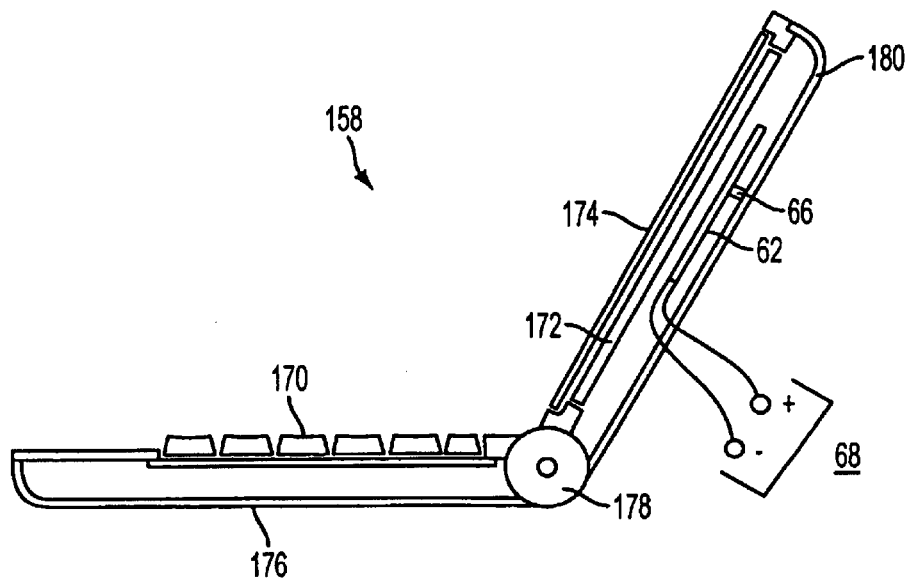
FIG. 5 shows a cross-section of a personal data assistant or other portable computer embodying the present invention.

FIG. 5 shows a personal data assistant (PDA) (158) which comprises the normal components, namely a case (176) which supports keys (170) and a lid (180) which is hinged about a hinge (178) to the case (176). The lid (180) supports a display (172), which may be liquid crystal display (LCD) or thin film transistor (TFT) and an optional front window (174) which may be fitted in front of the display (172). The lid (180) is designed to be capable of supporting bending wave vibration, preferably resonant bending wave vibration. An intendedly modal transducer (62), such as the transducer (62) of FIGS. 1A and 1B is mounted to the lid (180) by a connecting stub (66) to excite bending wave vibration to produce an acoustic output.

The transducer (62) has a mechanical source impedance, which is matched to that of the lid (180) whereby maximum power transfer may be achieved. As an alternative or in addition, a transducer may be mounted to the case (176).

Figure 6A:
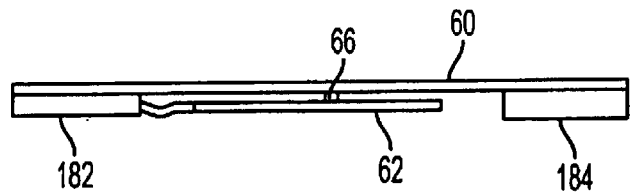
FIGS. 6A and 6B show side and plan views of a loudspeaker system embodying the present invention.
Figure 6B:
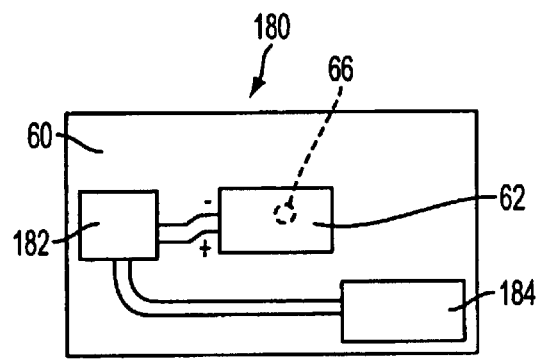

FIGS. 6A and 6B show a loudspeaker system comprising a panel (60) capable of supporting bending wave vibration, preferably resonant bending wave vibration and an intendedly modal transducer (62), such as the transducer (62) of FIGS. 1A and 1B. The transducer (62) is mounted to the panel (60) by a connecting stub (66) to excite bending wave vibration to produce an acoustic output.

The signal for the transducer (62) is provided by an amplifier (182) which is mounted on the panel (60). The system further comprises a power source (184), e.g. a battery, solar cell or direct infrared link, which powers the amplifier. Thus, the loudspeaker system (186) is adapted for operation as a wireless device, which may be used in a wireless panel/personal PA, self-powered solar panel, cordless devices or portable radio (e.g., a Walkman®). The system (186) may be fully remote powered—e.g. by a light/infrared power source.

Figure 7:
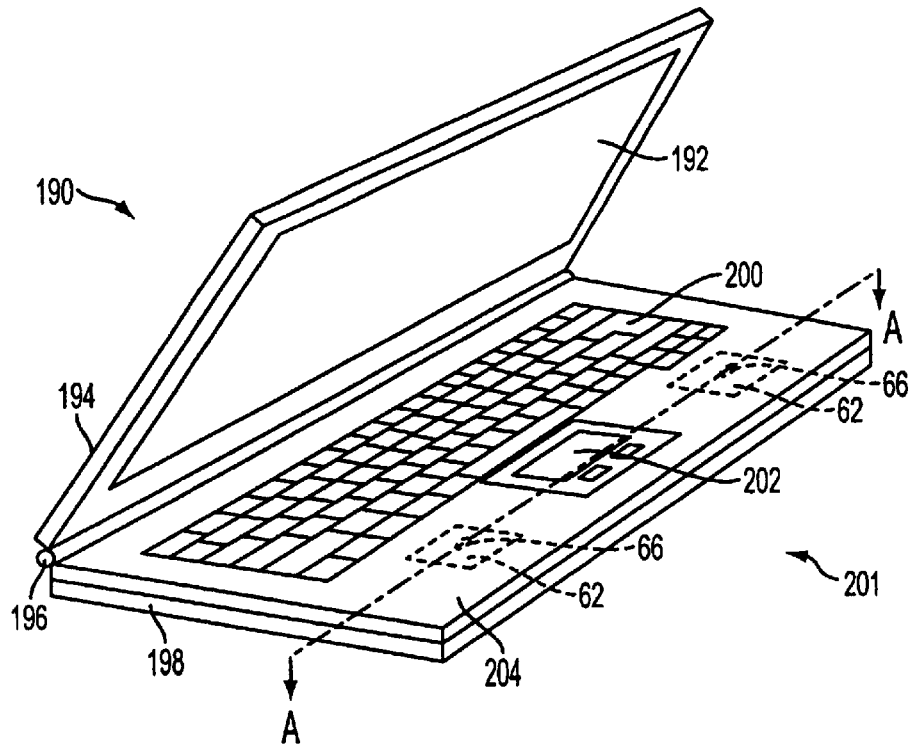
FIG. 7 shows a perspective view of a laptop computer embodying the present invention.
Figure 8:
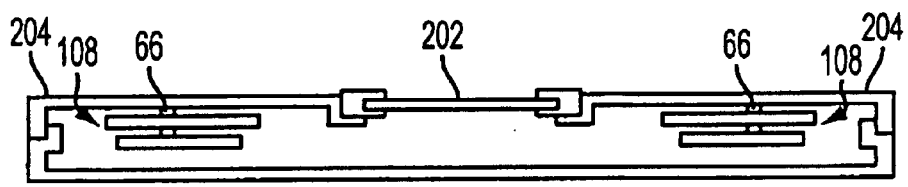
FIG. 8 shows a cross-section along line AA (shown in FIG. 7) of a second laptop computer embodying the present invention.

FIGS. 7 and 8 show a laptop computer (190) comprising the following standard components, namely a base (198) which supports keys (200) and a touch pad (202), and a lid (194) which is hinged about hinge (196) to the base. A display screen (192) is fitted into the lid (194). The keys (200) are located towards the screen (192). The touch pad (202) which is used for pointing functions sits near to the centre of the edge (201) of the base (198) which is closest to the user.

In FIG. 7, two modal transducers (62), such as those used in the FIGS. 1A and 1B embodiment, are mounted by stubs (66) within the base to an inner upper surface of the base. Alternatively, as shown in FIG. 8, modal transducers (108) such as that used in FIG. 3 may be used. The upper surface of the base (198) is designed to have regions (204) which cover all or part of the base (198) and which are capable of supporting bending wave vibration, preferably resonant bending wave vibration. In either embodiment, the transducers are mounted to two such regions to excite bending wave vibration to produce an acoustic output. The transducers may be designed to drive the local case mechanical impedance to achieve a high level of mechanical coupling efficiency.

Figure 9A:
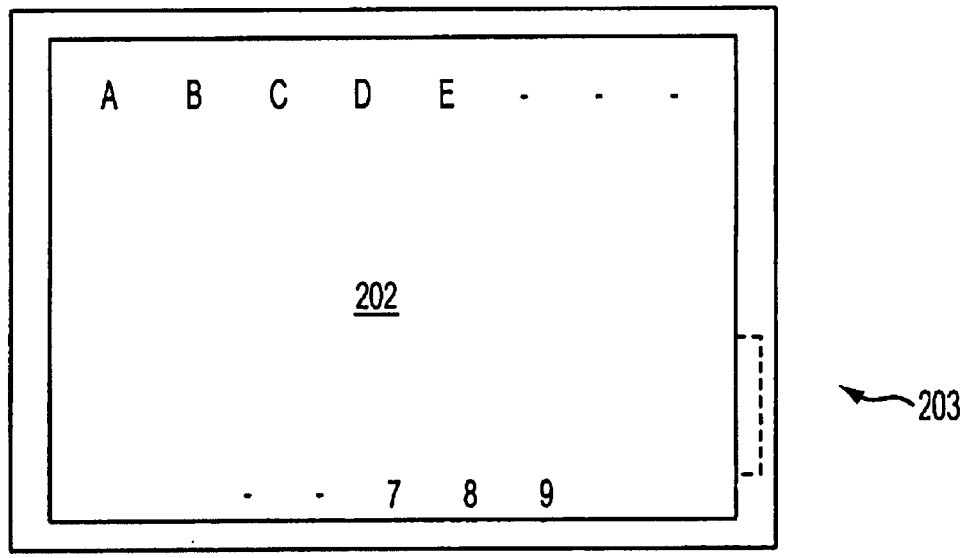
FIGS. 9A and 9B show plan and cross-sectional views of a touch pad assembly.
Figure 9B:
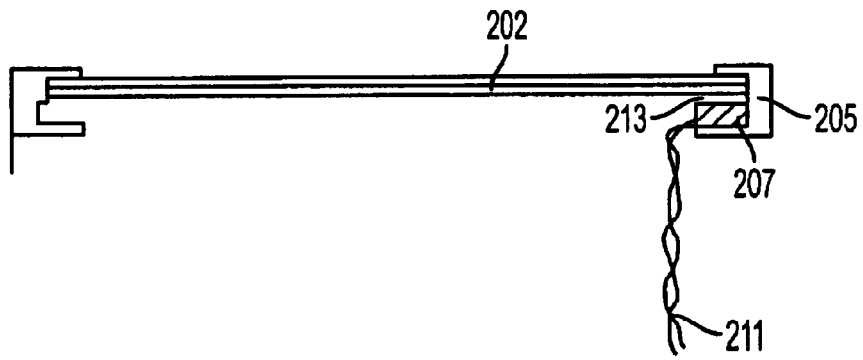

FIGS. 9A and 9B show a touch pad assembly (203) which may be used to replace the touch pad of FIGS. 7 and 8, or the touch pad of other embodiments of the invention. The touch pad assembly (203) comprises a touch pad (202), a frame (205) extending around the perimeter of the touch pad (202) and a transducer (207) mounted on the frame. The frame is grooved whereby the frame has a generally U-shaped cross-section. Both the touch pad (202) and the transducer (207) are mounted within the groove but are separated by a small air gap (213).

The touch pad (202) is made from a glass fibre reinforced plastics circuit board material and has mechanical impedance of approximately 3.59 Ns/m. The touch pad (202) is approximately 0.4 mm thick and a plastics laminate which is about 170 microns thick is adhered to a front surface of the touch pad (202). The plastics laminate provides a decorative or protective coating.

Figure 9C:
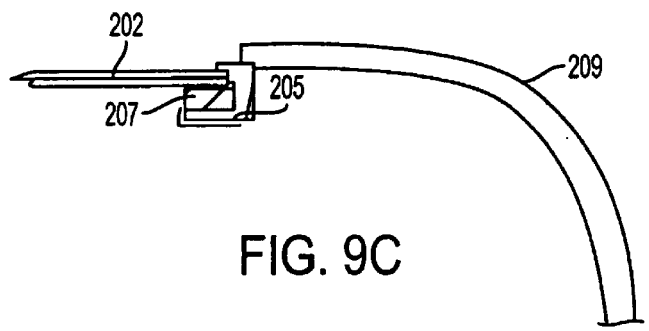
FIG. 9C shows a partial cross-sectional view of the touch pad assembly of FIGS. 9A and 9B incorporated in electronic apparatus.

As shown in FIG. 9C, the frame (205) of the touch pad assembly (203) is mounted to a casing (209) of an electronic apparatus, e.g. a laptop or a personal data assistant. The transducer (207) drives bending wave vibration in the frame (205). The frame (205) is mechanically and acoustically coupled to the casing (209) whereby vibration of the frame (205) is transmitted to the casing (209). The casing (209) forms the primary acoustic radiator of the electronic apparatus.

The transducer (207) is chosen to match the impedance of the combined touch pad (202) and wrist pad. The transducer (207) is preferably a DMT but may alternatively be an inertial or a grounded vibration transducer, actuator or exciter, e.g. moving coil transducer, a piezoelectric transducer, a magneto-strictive exciter, or a bender or torsional transducer (e.g. of the type taught in WO 00/13464 and corresponding U.S. patent application Ser. No. 09/384,419).

Figure 9D:
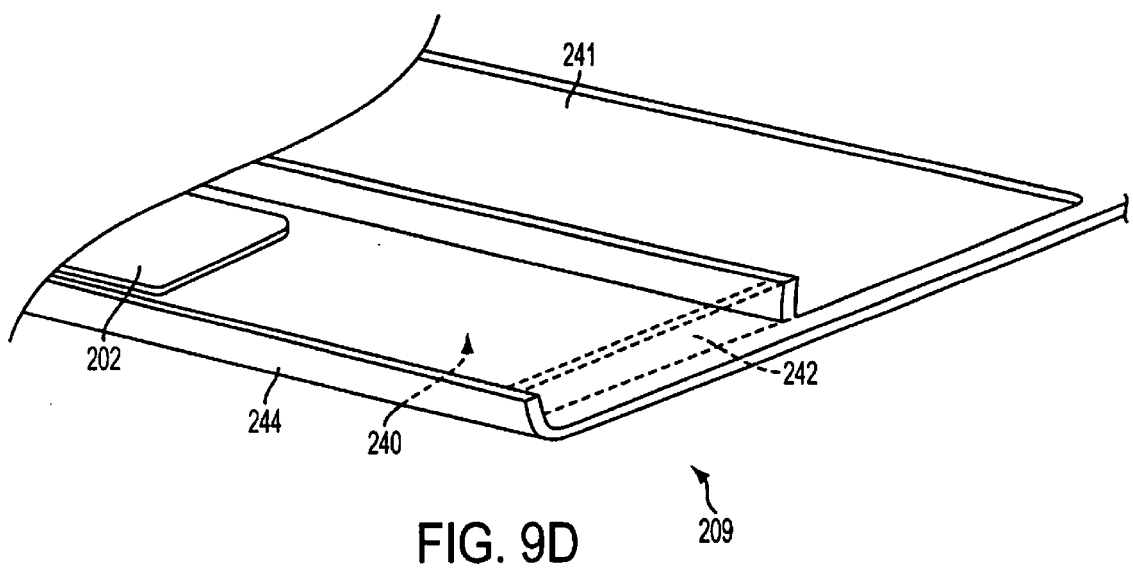
FIG. 9D shows a partial perspective view of the inside of the casing of a laptop incorporating a touch pad assembly of FIGS. 9A and 9B.

FIG. 9D shows a section of the inside of a laptop in which the touch pad assembly is mounted. FIG. 9D shows a view of the top of the casing (209) facing downwards. The touch pad (202) is supported in the casing (209) with areas (240) on either side of the touch pad (202) forming wrist rests. The casing (209) also comprises an aperture (241) in which the keyboard is inserted with a moulded divider (243) separating the aperture from the wrist rest areas (240). A strip (242) of 1.5 mm thick polystyrene can be attached down one edge of the wrist rests to help with the panel boundary conditions. A second strip (not shown) is attached to the wrist rest on the other side of the touch pad. The strips extend between a front wall (244) of the casing (209) and the moulded divider (243).

In each of the laptop embodiments, to avoid spurious rattles, small foam spacers may be fitted to any buttons on the casing and to the finned metal foil which connects the chassis of the central processing unit to a heat sink.

The benefit of such an arrangement is that the touch-pad and transducer are incorporated in a single integrated assembly. Furthermore, additional electrical connections (211) for the transducer may be easily added to the touch pad (202) which already carries electrical connections for other purposes. The integrated assembly provides the possibility of reducing complexity, weight and cost as well as taking up less space, which is at a premium in compact portable electronic articles.

Figure 10A:
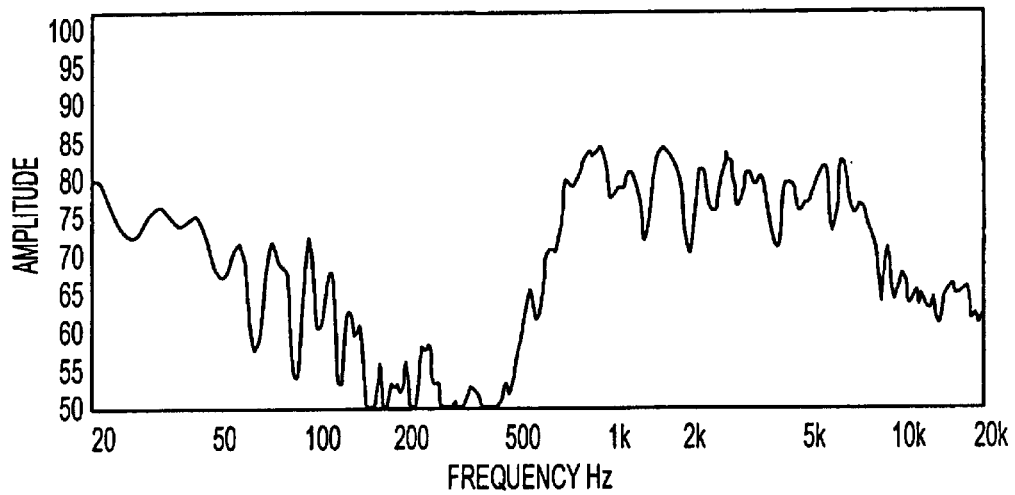
FIGS. 10A and 10B show graphs of sound output versus frequency for a known laptop and a laptop using the touch pad assembly of FIG. 9A, respectively.
Figure 10B:
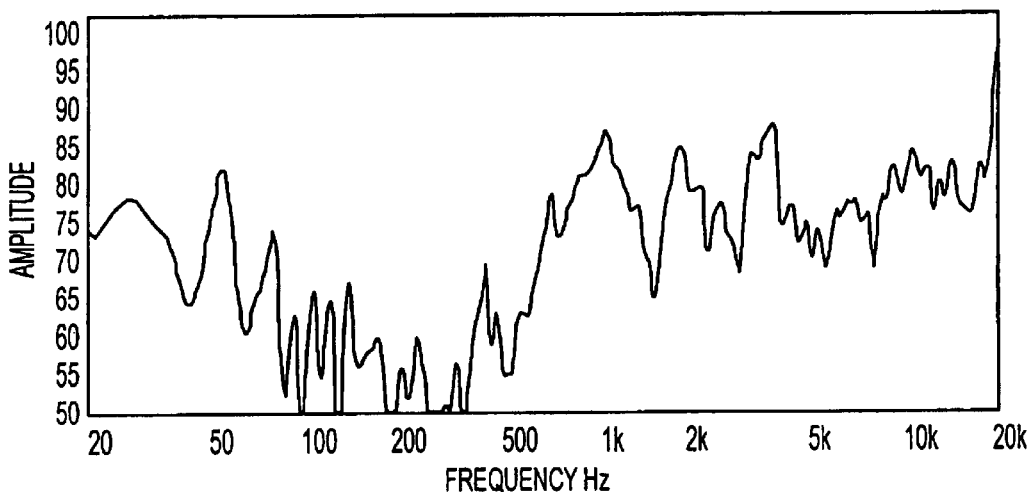

FIG. 10A shows the frequency response of a known DELL® laptop with an existing microspeaker. FIG. 10B shows the frequency response of a laptop in which the touch pad (202) of FIGS. 9A to 9C has been installed. Measurements were taken at about 25 cm above the wrist pad with the laptop placed on a flat desk which was heavy enough to not contribute to the measured output. The laptop according to the present invention (FIG. 10B) benefits from an improved level of treble.

Furthermore, the laptop according to the present invention has a speaker with a substantially capacitative impedance. In particular, the modulus of the impedance falls from over 1000 ohms at 1 kHz to 100 ohms at 10 kHz. Thus, generally the speaker has a falling power content as the frequency rises, especially for music.

Figure 10C:
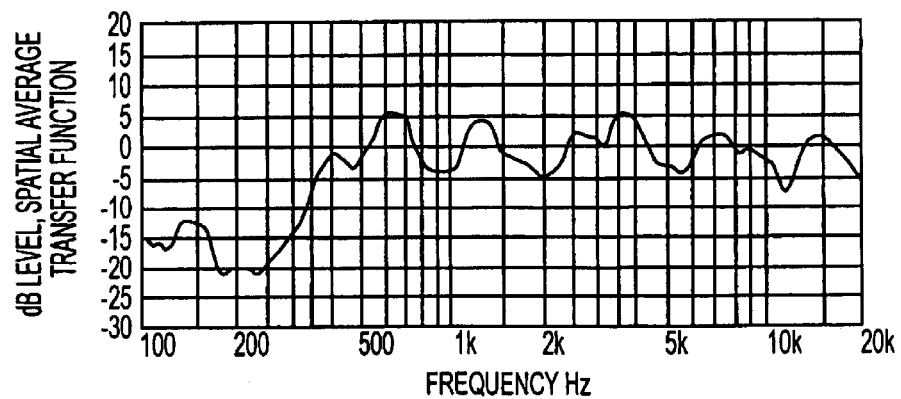
FIG. 10C is a graph of spatial average transfer function in dB against frequence for a second laptop using a touch pad assembly of FIG. 9B.

FIG. 10C illustrates the performance of a Compaq® laptop in which the touch pad has been replaced with an assembly similar to that shown in FIG. 9A. The transducer is mounted to the touch pad and drives both the touch pad and the casing (wrist rest) on either side of the touch pad. Two strips of about 1.5 mm thick polystyrene are attached down one edge of the wrist rests to help with the panel boundary conditions. The wrist rests on either side of the touch pad are adapted to have equal mechanical impedance. The impedance of the transducer was designed to match the overall impedance of the panel and wrist rests combined. Thus, the transducer is a double beam transducer with wider than normal beams of lengths of about 42 mm and about 39 mm, respectively.

As shown in FIG. 10C, the transducer has a low frequency limit of approximately 400 Hz. The acoustical output is dominated by the acoustical loading at the rear of the panel and if the small air space behind the panel is reduced, the bandwidth will be severely curtailed. For example, bandwidth extending down to 200 Hz may be achieved with a suitable transducer in a 6 mm air space but the low frequency limit rises to 600 Hz if the air space drops to 2 mm.

Figure 11A:
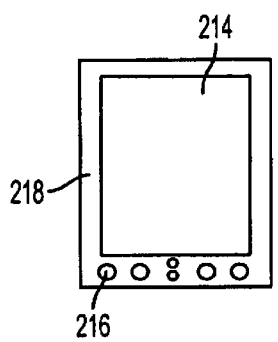
FIG. 11A is a front view of a personal data assistant (PDA) embodying the invention.

FIG. 11A shows a front view of a personal data assistant (PDA) which often have a touch screen (214), as well as buttons (216) for control and data input. A sectioned view in FIG. 9B shows the PDA in more detail. The case (218) is usually made in two parts, which fit together to contain the display screen (220) and the electronics are fitted onto an internal printed circuit board (224). The rear of the case (usually a plastics moulding) is used to radiate sound by attaching a transducer (108) via a stub (66). The transducer (108) comprises a longer beam (112) driving the stub (66) with a second beam (110) connected by way of a second stub (152). Although in this case the longer beam (112) is close to the case (218), the two beams (110, 112) could be exchanged without any detriment. Leads are provided for electrical input connections.

Figure 12A:
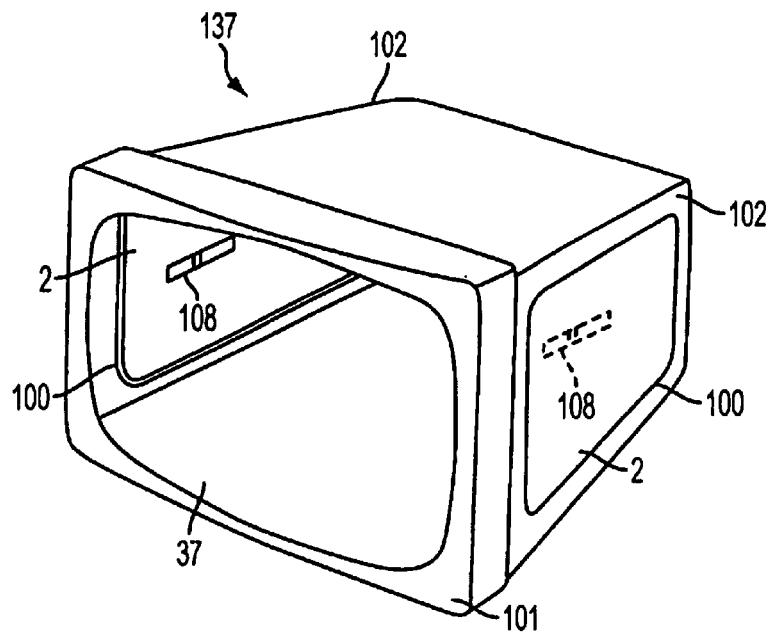
FIG. 12A is a perspective view of a visual display unit (VDU) embodying the present invention.
Figure 12B:
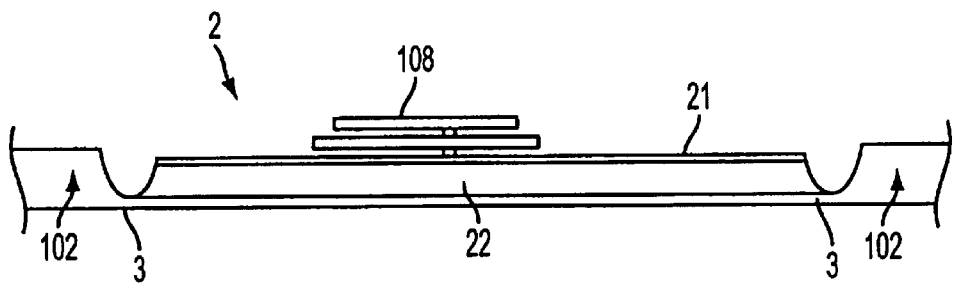
FIG. 12B is a cross-sectional view of part of the VDU of FIG. 12A.

FIG. 12A shows a perspective view of a visual display unit (137) formed in any desired fashion, e.g. as a cathode ray tube or as a liquid crystal display. The unit (137) comprises a box-like housing (101) having a display screen (37) mounted in a front face, a rear face and opposed sides (102). As shown more clearly in FIG. 12B, a generally rectangular panel (2) is defined by grooves (3) in each of the opposed sides (102). Each panel (2) comprises a core (22) sandwiched between two skins (21). A double beam transducer (108), as described above, is attached to each panel (2) to launch/excite bending waves into the panels to cause them to resonate to produce an acoustic output.

The use of the intendly modal transducer (108) allows good mechanical coupling to be achieved by matching the mechanical impedance of the transducer to the side. Thus, although the panels (2) may be specifically designed to be optimised for acoustic performance, i.e. may be light and stiff, this is not essential. This avoids the need for substantial changes in the manufacturing requirements and methods utilised by the monitor/TV manufacturer.

Figure 13A:
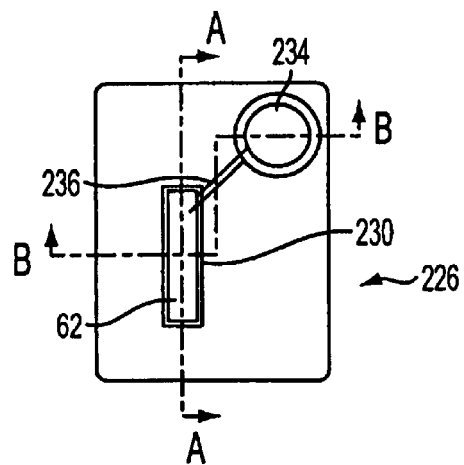
FIG. 13A is a front view of a credit card embodying the present invention.
Figure 13B:
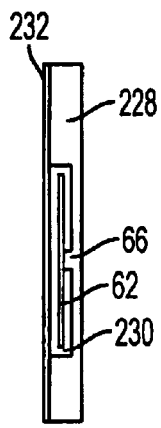
FIG. 13B is a cross-sectional side view of the credit card of FIG. 13A and taken along the line A—A.
Figure 13C:
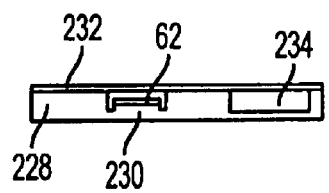
FIG. 13C is a cross-sectional view of the credit card of FIG. 13A and taken along the line B—B.

FIGS. 13A to 13C show a credit card (226) in which a single beam transducer (62) is mounted within a pocket (230) in the body (228) of the card (226). The transducer (62) drives the card to radiate sound by way of a stub (66) which may be integrally moulded into the body (228). The pocket (230) allows the ends of the transducer (62) to freely vibrate without touching any other parts of the card. The card is powered by an embedded electronic circuit (234), which may comprise a power source, memory, signal processing and amplification and is connected to wires (236) linked to the transducer (62). A thin cover (232), which may be made from a suitable paper, plastics or metal, is provided to enclose the transducer (62) and electronic circuit (234).

Figure 14:
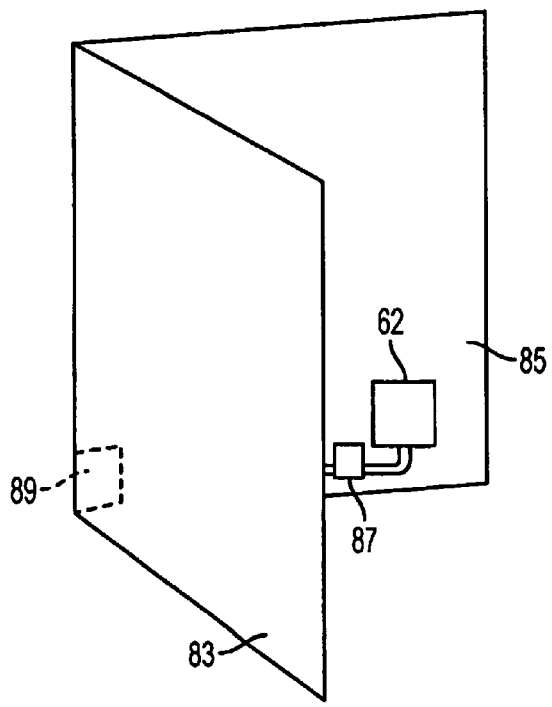
FIG. 14 is a perspective view of a greeting card embodying the present invention.

FIG. 14 shows a greeting or similar card (81) in the form of a folded member having a front leaf (83) and a rear leaf (85). A transducer (62) is attached to one of the leaves, preferably the rear leaf (85), by way of a small stub (not shown), to vibrate the leaf to cause it to resonate to produce an acoustic output. The transducer (62) is driven by a signal generator/amplifier battery unit (87), which is actuated by a switch (89) concealed in the fold of the card so as to activate the signal generator when the card is opened.

Figure 11B:
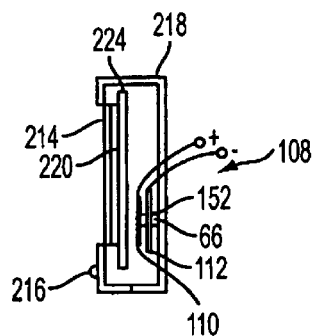
FIG. 11B is a cross-sectional side view of the PDA of FIG. 11A.
Figure 15A:
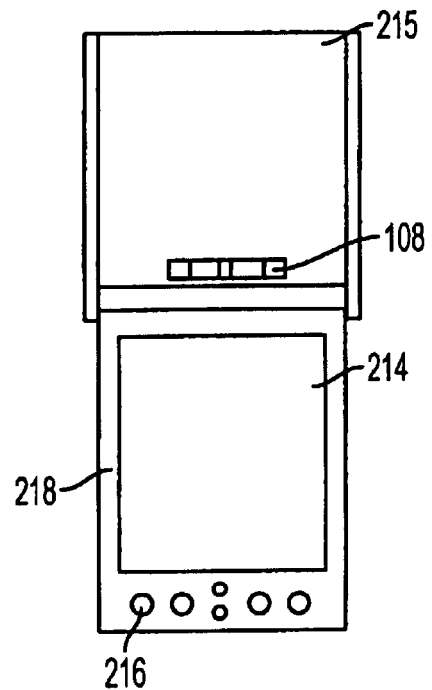
FIG. 15A is a front view of an alternative personal data assistant (PDA) embodying the present invention.
Figure 15B:
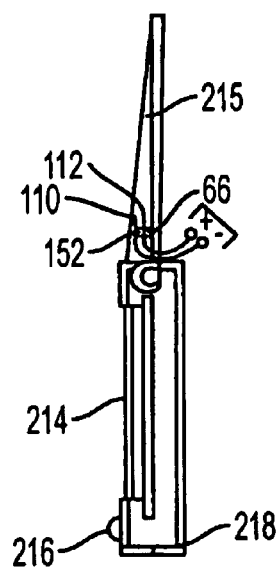
FIG. 15B is a cross-sectional side view of the PDA of FIG. 15A.

FIGS. 15A and 15B show a PDA similar to that of FIGS. 11A and 11B and thus elements in common have the same reference number. The PDA differs in that it comprises a lid (215) which protects the touch screen (214) and which is depicted in its open position, i.e. that of normal use. A double beam transducer (108) is attached to the lid (215) by a stub (66) to enable the lid (215) to be used as a loudspeaker. This stub (66) may be integrally moulded into the lid (215). The transducer (108) comprises two beams (110, 112) of different lengths connected together by a stub (152). Electrical connections are made by wires to the drive circuitry within the body (218) of the PDA (not shown).

The remaining figures show alternative transducers which may be used in conjunction with the embedded loudspeakers embodied in FIGS. 1 to 15B. An intendedly modal transducer may be designed with reduced mass and depth compared to a moving coil/permanent magnet design. Accordingly, the use of such a transducer should reduce the overall weight of the loudspeaker and the transducer should be suitable for installations in which space is limited. Thus, the transducer is ideally suited to portable applications shown in FIGS. 1 to 15B.

Figure 16:
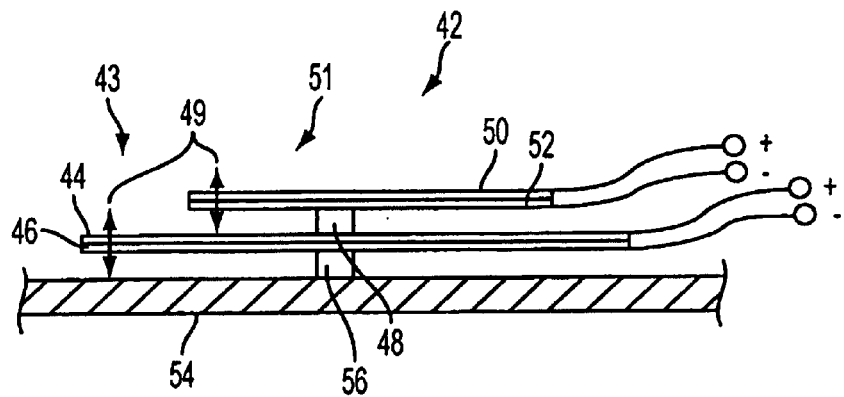
FIGS. 16 to 22 are side views of alternative modal transducers which may be used in the present invention.

FIG. 16 shows a transducer (42) which comprises a first piezoelectric beam (43) on the back of which is mounted a second piezoelectric beam (51) by connecting means in the form of a stub (48) located at the centre of both beams. Each beam is a bi-morph. The first beam (43) comprises two layers (44,46) of piezoelectric material and the second beam (51) comprises two layers (50,52). The poling directions of each layer of piezoelectric material are shown by arrows (49). Each layer (44, 50) has an opposite poling direction to each layer (46, 52), respectively, in the bi-morph. The bimorph may also comprise a central conducting vane which allows a parallel electrical connection as well as adding a strengthening component to the ceramic piezoelectric layers.

Each layer of each beam (43, 51) may be made of the same or different piezoelectric material. Each layer is generally of a different length.

The first piezoelectric beam (43) is mounted on a panel (54) by coupling means in the form of a stub (56) located at the centre of the first beam. By mounting the first beam (43) at its centre only the even order modes will produce output. By locating the second beam (51) behind the first beam, and coupling both beams centrally by way of a stub they can both be considered to be driving the same axially aligned or co-incident position.

When beams (43, 53) are joined together, the resulting distribution of modes is not the sum of the separate sets of frequencies, because each beam modifies the modes of the other. The two beams (43, 51) are designed so that their individual modal distributions are interleaved to enhance the overall modality of the transducer. The two beams (43, 51) add together to produce a useable output over a frequency range of interest. Local narrow dips occur because of the interaction between the piezoelectric beams at their individual even order modes.

The second beam may be chosen by using the ratio of the fundamental resonance of the two beams. If the materials and thicknesses are identical, then the ratio of frequencies is just the square of the ratio of lengths. If the higher f0 (fundamental frequency) is simply placed half way between f0 and f1 of the other, larger beam, f3 of the smaller beam and f4 of the lower beam coincide.

Plotting a graph of a cost function against the ratio of the frequency for two beams shows that the ideal ratio is about 1.27:1, namely where the cost function is minimised. This ratio is equivalent to the "golden" aspect ratio (i.e., a ratio of f02:f20) described in WO97/09842 and in corresponding U.S. Pat. No. 6,332,029. The method of improving the modality of a transducer may be extended by using three piezoelectric beams in the transducer. The ideal ratio is about 1.315:1.147:1.

The method of combining active elements, e.g. beams, may be extended by using piezoelectric discs. Using two discs, the ratio of sizes of the two discs depends upon how many modes are taken into consideration. For high order modal density, a ratio of fundamental frequencies of about 1.1+/−0.02 to 1 may give good results. For low order modal density (i.e., the first few or first five modes), a ratio of fundamental frequencies of about 3.2:1 is good. The first gap comes between the second and third modes of the larger disc.

Since there is a large gap between the first and second radial modes in each disc, much better interleaving is achieved with three rather than with two discs. When adding a third disc to the double disc transducer, the obvious first target is to plug the gap between the second and third modes of the larger disc of the previous case. However, geometric progression shows that this is not the only solution. Using fundamental frequencies of f0, $\alpha$.f0 and $\alpha^2$.f0, and plotting rms ($\alpha$.$\alpha^2$) there exist two principal optima for $\alpha$. The values are about 1.72 and about 2.90, with the latter value corresponding to the obvious gap-filling method.

Using fundamental frequencies of f0, $\alpha$.f0 and $\beta$.f0, so that both scalings are free, and using the above values of $\alpha$ as seed values, slightly better optima may be achieved. The parameter pairs (α, β) are (1.63, 3.03) and (3.20, 8.19). These optima are quite shallow, meaning that variations of 10%, or even 20%, in the parameter values are acceptable.

An alternative approach for determining the different discs to be combined is to consider the cost as a function of the ratio of the radii of the three discs. The cost functions may be RSCD (ratio of sum of central differences), SRCD (sum of the ratio of central differences) and SCR (sum of central ratios). For a set of modal frequencies, $f_2, f_1, f_n, \ldots f_N$, these functions are defined as:

RSCD (R sum CD):

$$RSCD = \frac{\frac{1}{N-1}\sum_{n=1}^{N-1}(f_{n+1} + f_{n-1} - 2f_n)^2}{f_0}$$

SCRD (sum RCD):

$$SRCD = \frac{1}{N-1}\sum_{n=1}^{N-1}\left(\frac{f_{n+1} + f_{n-1} - 2f_n}{f_n}\right)^2$$

CR:

$$SCR = \frac{1}{N-1}\sum_{n=1}^{N-1}\left(\frac{f_{n+1} \cdot f_{n-1}}{(f_n)^2}\right)$$

The optimum radii ratio, i.e., where the cost function is minimised, is 1.3 for all cost functions. Since the square of the radii ratio is equal to the frequency ratio, for these identical material and thickness discs, the results of (1.3)(1.3)=1.69 and the analytical result of 1.67 are in good agreement.

Figure 17:
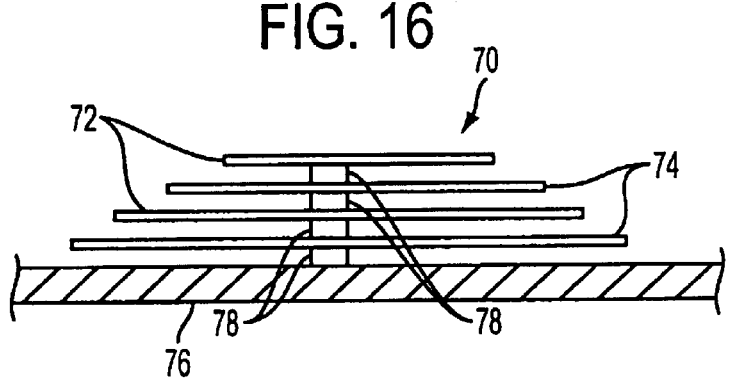

Alternatively or additionally, passive elements may be incorporated into the transducer to improve its overall modality. The active and passive elements may be arranged in a cascade. FIG. 17 shows a multiple disc transducer (70) comprising two active piezoelectric elements (72) stacked with two passive resonant elements (74), e.g. thin metal plates so that the modes of the active and passive elements are interleaved.

The elements are connected by connecting means in the form of stubs (78) located at the centre of each active and passive element. The elements are arranged concentrically. Each element has different dimensions with the smallest and largest discs located at the top and bottom of the stack, respectively. The transducer (70) is mounted on a load device (76), e.g. a panel, by coupling means in the form of a stub (78) located at the centre of the first passive device which is the largest disc.

The method of improving the modality of a transducer may be extended to a transducer comprising two active elements in the form of piezoelectric plates. Two plates of dimensions (1 by α) and (αby α²) are coupled at (³⁄₇, ⅘). The frequency ratio is therefore about 1.3:1 (1.14×1.14= 1.2996).

Figure 18:
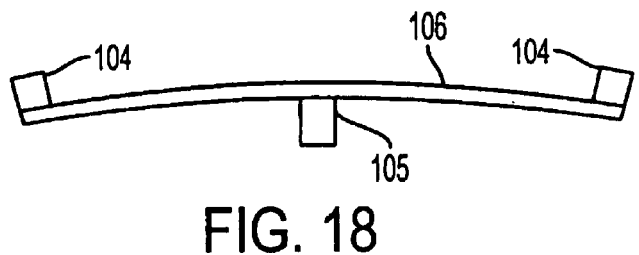
Figure 19:
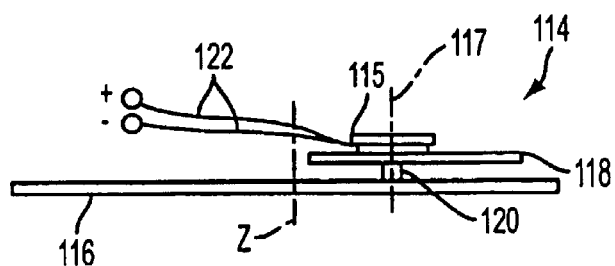

As shown in FIG. 18, small masses (104) may be mounted at the end of the piezoelectric transducer (106) having coupling means (105). In FIG. 19, the transducer (114) is an inertial electrodynamic moving coil exciter, e.g. as described in WO97/09842 and corresponding U.S. Pat. No. 6,332,029, having a voice coil forming an active element (115) and a passive resonant element in the form of a modal plate (118).

The active element (115) is mounted on the modal plate (118) and off-centre of the modal plate.

The modal plate (118) is mounted on the panel (116) by a coupler (120). The coupler is aligned with the axis (117) of the active element but not with the axis (Z) normal to the plane of the panel (116). Thus the transducer is not coincident with the panel axis (Z). The active element (115) is connected to an electrical signal input via electrical wires (122). The modal plate (118) is perforate to reduce the acoustic radiation therefrom and the active element (115) is located off-centre of the modal plate (118), for example, at the optimum mounting position, i.e. about (³⁄₇, ⅘).

Figure 20:
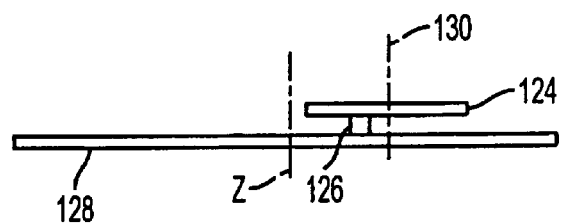

FIG. 20 shows a transducer (124) comprising an active piezoelectric resonant element which is mounted by coupling means (126) in the form of a stub to a panel (128). Both the transducer (124) and panel (128) have ratios of width to length of about 1:1.13. The coupling means (126) is not aligned with any axes (130,Z) of the transducer or the panel. Furthermore, the placement of the coupling means (126) is located at the optimum position, i.e. off-centre with respect to both the transducer (124) and the panel (128).

Figure 21:
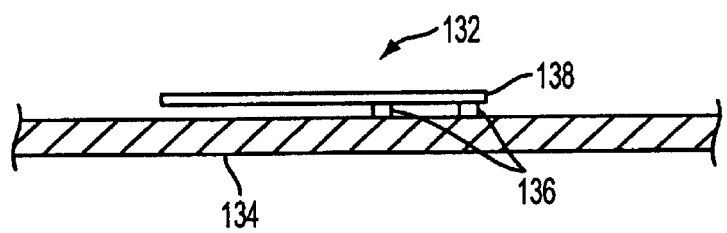

FIG. 21 shows a transducer (132) in the form of active piezoelectric resonant element in the form of a beam. The transducer (132) is coupled to a panel (134) by two coupling means (136) in the form of stubs. One stub is located towards an end (138) of the beam and the other stub is located towards the centre of the beam.

Figure 22:
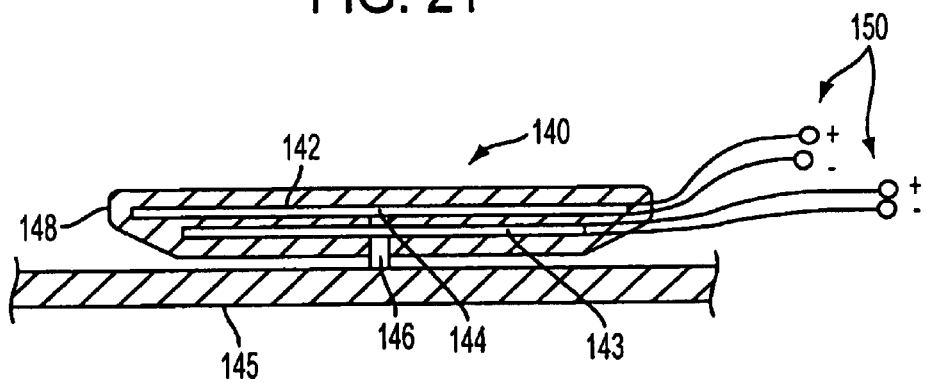

FIG. 22 shows a transducer (140) comprising two active resonant elements (142, 143) coupled by connecting means (144) and an enclosure (148) which surrounds the connecting means (144) and the resonant elements (142, 143). The transducer (140) is thus made shock and impact resistant. The enclosure (148) is made of a low mechanical impedance rubber or comparable polymer so as not to impede the transducer operation. If the polymer is water resistant, the transducer (140) may be made waterproof.

The upper resonant element (142) is larger than the lower resonant element (143) which is coupled to a panel (145) via a coupling means in the form of a stub (146). The stub (146) is located at the centre of the lower resonant element (143). Power couplings (150) for each active element (142, 143) extend from the enclosure (148) to allow good audio attachment to a load device (not shown).

Figure 23:
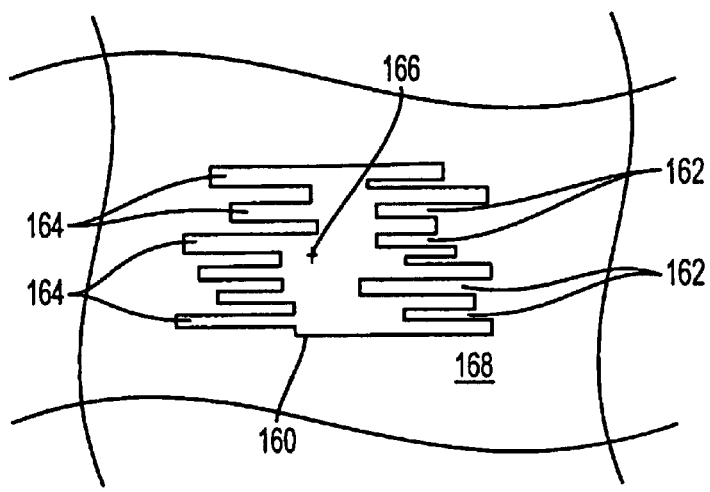
FIG. 23 is a plan view of an alternative modal transducer which may be used in the present invention.

FIG. 23 shows a transducer (160) in the form of a plate-like active resonant element. The resonant element is formed with slots (162) which define fingers (164) and thus form a multi-resonant system. The resonant element is mounted on a panel (168) by a coupling means in the form of a stub (166).

In FIGS. 24A and 24B, the transducer (14) is rectangular with out-of-plane curvature and is a pre-stressed piezoelectric transducer of the type disclosed in U.S. Pat. No. 5,632, 841 (International patent application WO 96/31333) and produced by PAR Technologies Inc. under the trade name NASDRIV. Thus, the transducer (14) is an active resonant element. The transducer (14) has a width (W) and a length (L) and a position (x) defining an attachment point (16).

The curvature of the transducer (14) means that the coupling means (16) is in the form of a line of attachment. When the transducer (14) is mounted along a line of attachment along the short axis through the centre, the resonance frequencies of the two arms of the transducer are coincident. The optimum suspension point may be modelled and is the line of attachment at about 43% to 44% along the length of the resonant element. The cost function (or measure of "badness") is minimised at this value; this corresponds to an estimate for the attachment point at ⁴⁄₉ths of the length.

Furthermore, computer modelling showed this attachment point to be valid for a range of transducer widths. A second suspension point at about 33% to 34% along the length of the resonant element also appears suitable.

By plotting a graph of cost (or rms central ratio) against aspect ratio (AR=W/2L) for a resonant element mounted at about 44% along its length, the optimum aspect ratio may be determined to be about 1.06+/−0.01 to 1 since the cost function is minimised at this value.

The optimum angle of attachment θ to the panel (12) may be determined using two "measures of badness" to find the optimum angle. For example, the standard deviation of the log (dB) magnitude of the response is a measure of "roughness". Such figures of merit/badness are discussed in International Application WO 99/41939 and corresponding U.S. patent application Ser. No. 09/246,967, of the present applicants. For an optimised transducer, namely one with aspect ratio about 1.06:1 and attachment point at about 44% using modelling, rotation of the line of attachment (16) will have a marked effect since the attachment position is not symmetrical. There is a preference for an angle of about 270°, i.e. with the longer end facing left.

FIGS. 25A and 25B show an asymmetrically shaped transducer (18) in the form of a resonant element having a trapezium shaped cross-section. The shape of a trapezium is controlled by two parameters, AR (aspect ratio) and TR (taper ratio). AR and TR determine a third parameter, λ, such that some constraint is satisfied, for example, equal mass either side of the line.

The constraint equation for equal mass (or equal area) is as follows:

$$\int_0^\lambda \left(1 + 2TR\left(\frac{1}{2} - \xi\right)\right) d\xi = \int_\lambda^1 \left(1 + 2TR\left(\frac{1}{2} - \xi\right)\right) d\xi$$

The above may readily be solved for either TR or λ as the dependent variable, to give:

$$TR = \frac{1 - 2\lambda}{2\lambda(1 - \lambda)} \text{ or } \lambda = \frac{1 + TR - \sqrt{1 + TR^2}}{2TR} \approx \frac{1}{2} - \frac{TR}{4}$$

Equivalent expressions are readily obtained for equalising the moments of inertia, or for minimising the total moment of inertia.

The constraint equation for equal moment of inertia (or equal 2nd moment of area) is as follows:

$$\int_0^\lambda \left(1 + 2TR\left(\frac{1}{2} - \xi\right)\right)(\lambda - \xi)^2 d\xi = \int_\lambda^1 \left(1 + 2TR\left(\frac{1}{2} - \xi\right)\right)(\xi - \lambda)^2 d\xi$$

$$TR = \frac{(\lambda^2 - \lambda + 1)(2\lambda - 1)}{2\lambda^4 - 4\lambda^3 + 2\lambda - 1} \text{ or } \lambda \approx \frac{1}{2} - \frac{TR}{8}$$

The constraint equation for minimum total moment of inertia is:

$$\frac{d}{d\lambda}\left(\int_0^1 \left(1 + 2TR\left(\frac{1}{2} - \xi\right)\right)(\lambda - \xi)^2 d\xi\right) = 0$$

$$TR = 3 - 6\lambda \text{ or } \lambda = \frac{1}{2} - \frac{TR}{6}$$

A cost function (measure of "badness") was plotted for the results of 40 FEA runs with AR ranging from 0.9 to 1.25, and TR ranging from 0.1 to 0.5, with λ constrained for equal mass. The transducer is thus mounted at the centre of mass. The results are tabulated below and show that there is an optimum shape with AR=1 and TR=0.3, giving λ at close to 43%.

| tr | λ | 0.9 | 0.95 | 1 | 1.05 | 1.1 | 1.15 | 1.2 | 1.25 |
|---|---|---|---|---|---|---|---|---|---|
| 0.1 | 47.51% | 2.24% | 2.16% | 2.16% | 2.24% | 2.31% | 2.19% | 2.22% | 2.34% |
| 0.2 | 45.05% | 1.59% | 1.61% | 1.56% | 1.57% | 1.50% | 1.53% | 1.66% | 1.85% |
| 0.3 | 42.66% | 1.47% | 1.30% | 1.18% | 1.21% | 1.23% | 1.29% | 1.43% | 1.59% |
| 0.4 | 40.37% | 1.32% | 1.23% | 1.24% | 1.29% | 1.25% | 1.29% | 1.38% | 1.50% |
| 0.5 | 38.20% | 1.48% | 1.44% | 1.48% | 1.54% | 1.56% | 1.58% | 1.60% | 1.76% |

One advantage of a trapezoidal transducer is that the transducer may be mounted along a line of attachment which is at its centre of gravity/mass but is not a line of symmetry. Such a transducer would thus have the advantages of improved modal distribution, without being inertially unbalanced. The two methods of comparison used previously again select about 270° to about 300° as the optimum angle of orientation.

The transducer used in the present invention may be seen as the reciprocal of a distributed mode panel, e.g. as described in WO97/09842 and corresponding U.S. Pat. No. 6,332,029, in that the transducer is designed to be a distributed mode object.

It should be understood that this invention has been described by way of examples only and that a wide variety of modifications can be made without departing from the scope of the invention as described in the accompanying claims.

We claim:

1. A touch pad assembly for use in an electronic article having a casing, the touch pad assembly comprising:
 a touch pad;
 a first coupler adapted to couple mechanically the touch pad to the casing of the electronic article;
 a transducer; and
 a second coupler adapted to mount the transducer so that the transducer drives the casing as an acoustic radiator.

2. A touch pad assembly according to claim 1, wherein the first coupler is in the form of a frame surrounding a periphery of the touch pad.

3. A touch pad assembly according to claim 2, wherein the second coupler couples the transducer to the frame.

4. A touch pad assembly according to claim 1, wherein the second coupler couples the transducer to the touch pad.

5. A touch pad assembly according to claim 1, wherein the transducer has an intended operative frequency range and comprises at least one resonant element having a frequency distribution of modes in the operative frequency range.

6. A touch pad assembly according to claim 5, wherein the second coupler is mounted on the resonant element at a position for coupling modal activity of the resonant element.

7. A touch pad assembly according to claim 5, wherein parameters of the resonant element are selected to enhance the distribution of modes in the resonant element in the operative frequency range.

8. A touch pad assembly according to claim 7, wherein the distribution of modes in the resonant element is enhanced by ensuring the distribution has a density of modes which is sufficient for the resonant element to provide an effective mean average force which is substantially constant with frequency.

9. A touch pad assembly according to claim 7, wherein the distribution of modes is enhanced by distributing the resonant bending wave modes substantially evenly in frequency.

10. A touch pad assembly according to claim 7, wherein the resonant element is modal along two substantially normal axes, each axis having an associated fundamental frequency, and wherein the ratio of the two associated fundamental frequencies is adjusted for best modal distribution.

11. A touch pad assembly according to claim 10, wherein the ratio of the two fundamental frequencies is about 9:7.

12. A touch pad assembly according to claim 5, wherein the transducer comprises a plurality of resonant elements each having a distribution of modes, the modes of the resonant elements being arranged to interleave in the operative frequency range whereby the distribution of modes in the transducer is enhanced.

13. A touch pad assembly according to claim 5, wherein the resonant element is plate-like.

14. A touch pad assembly according to claim 13, wherein the shape of the resonant element is selected from the group consisting of beam-like, trapezoidal, hyperelliptical, generally disc shaped, and rectangular.

15. A touch pad assembly according to claim 5, wherein the first coupler is in the form of a frame surrounding a periphery of the touch pad.

16. A touch pad assembly according to claim 15, wherein the second coupler couples the transducer to the frame.

17. An electronic article, comprising:
a body; and
a touch pad assembly comprising:
  a touch pad surrounding the body;
  a first coupler adapted to couple mechanically the touch pad to the body;
  a transducer; and
  a second coupler adapted to mount the transducer so that the transducer drives the body as an acoustic radiator.

18. An electronic article according to claim 17, wherein the transducer drives both the touch pad and the body surrounding the touch pad to produce an acoustic output with the body acting as the primary acoustic radiator.

19. An electronic article according to claim 18, further comprising:
at least one additional transducer mounted on the body.

20. An electronic article according to claim 17, wherein the transducer has an intended operative frequency range and comprises a resonant element having a frequency distribution of modes in the operative frequency range.

21. An electronic article according to claim 20, wherein parameters of the resonant element are selected to enhance the distribution of modes in the resonant element in the operative frequency range.

22. An electronic article according to claim 21, wherein the distribution of modes in the resonant element is enhanced by ensuring the distribution has a density of modes which is sufficient for the resonant element to provide an effective mean average force which is substantially constant with frequency.

23. An electronic article according to claim 21, wherein the distribution of modes is enhanced by distributing the resonant bending wave modes substantially evenly in frequency.

* * * * *